United States Patent [19]

Fitch et al.

[11] 4,231,065

[45] Oct. 28, 1980

[54] LOCAL AREA CONTRAST ENHANCEMENT DEVICE

[75] Inventors: Robert C. Fitch, Roseville; Patrenahalli M. Narendra, Plymouth, both of Minn.

[73] Assignee: Honeywell Inc., Minneapolis, Minn.

[21] Appl. No.: 2,489

[22] Filed: Jan. 11, 1979

[51] Int. Cl.$^3$ .............................................. H04N 5/14
[52] U.S. Cl. .................................. 358/166; 358/169
[58] Field of Search ............. 340/146.3 T, 146.3 AE; 364/811, 851, 857; 328/142; 358/32, 160, 164, 166, 169, 280, 282, 284

[56] References Cited

U.S. PATENT DOCUMENTS

| | | | |
|---|---|---|---|
| 3,181,007 | 4/1965 | Hinds | 358/282 |
| 3,600,506 | 8/1971 | Richeson, Jr. | 358/282 |
| 3,751,586 | 8/1973 | Johansson | 358/113 |
| 3,786,183 | 1/1974 | Satterfield | 358/126 |
| 3,790,706 | 2/1974 | Gubala et al. | 358/169 |
| 3,898,379 | 8/1975 | Howe et al. | 358/166 |
| 3,952,144 | 4/1976 | Kolker | 358/280 |
| 3,996,421 | 12/1976 | Pruznick et al. | 358/166 |
| 4,057,828 | 11/1977 | Monahan | 358/169 |
| 4,081,836 | 3/1978 | Skinner | 358/166 |

OTHER PUBLICATIONS

Publication entitled "Image Enhancement Techniques for Cockpit Displays", an unclassified report on DD form 1473 submitted by Ketcham, Lowe and Weber of the Hughes Aircraft Company to the Navy and bearing the catalog No. AD-A008 458 and indicating the report date being Dec. 1974.

A paper entitled "Real-Time Image Enhancement Techniques" by David J. Ketcham of the Hughes Aircraft Company and appearing in SPIE/OSA vol. 74 (1976) on pp. 120-125.

An article entitled "Constant Variance Enhancement: A Digital Processing Technique" authored by James L. Harris, Sr. and found on pp. 1268-1271 of vol. 1, No. 5/May 1977 issue of Applied Optics.

Primary Examiner—Benedict V. Safourek
Attorney, Agent, or Firm—Charles J. Ungemach

[57] ABSTRACT

A local area contrast enhancement scheme for a video display includes a two dimensional recursive filter to obtain a moving average of the intensity variations in all areas of the display. This moving average is subtracted from the original signal to produce a signal which contains only local variations and this latter signal is expanded to increase the display contrast. The local area contrast enhancement scheme allows low contrast details to be perceived and permits hands-off operation of the display under varying scene conditions. The recursive filter approach results in a simple implementation of the enhancement scheme with both analog and digital circuitry.

8 Claims, 11 Drawing Figures

LOCAL AREA CONTRAST ENHANCEMENT DEVICE

BACKGROUND OF THE INVENTION

The present invention relates generally to apparatus for improving the contrast of a displayed image so as to increase the ability of the viewer to discern low contrast objects which are in different backgrounds. The invention may be used in visual or infrared displays and, for example, by pilots or gunners who are attempting to distinguish targets from background areas. It also may be used in facsimile reproduction for automatic thresholding.

Apparatus for detecting or improving video contrast is known in the art. For example, U.S. Pat. No. 3,786,183 shows a system for detecting an area of high contrast for tracking purposes but does not provide for contrast enhancement. U.S. Pat. Nos. 3,952,144 issued to Carl R. Kolker Apr. 20, 1976, and 3,790,706 issued to Thomas J. Jubala Feb. 5, 1974 show devices for controlling contrast but these patents perform only "global" scaling and do not provide for local area enhancement. When global scaling is performed, the entire signal presented to the display is subjected to the same gain. In a scene with large intensity excursions over the entire field of view, this gain is made small so as not to saturate the display and this results in local details being lost. Other prior art such as U.S. Pat. No. 3,181,007 issued to Virgil A. Hinds Apr. 27, 1965, U.S. Pat. No. 3,600,506 issued to William E. Richeson, Jr. Aug. 17, 1971 and U.S. Pat. No. 3,751,586 issued to Bengt H. Johansson Aug. 7, 1973 show circuits in which there is continuous scaling of signals but these patents perform their scaling on a "scan-line" basis wherein each line or a group of entire lines of the video are averaged to compute the background estimate. The difficulty with "scan-line" enhancement is that it does not take into account a local area immediately surrounding every point in the image. When only a fraction of the current line is used in the background average, the estimate of the background does not follow the background changes in the vertical (across the scan-line) direction. When several whole lines are used to compute the average as suggested by the Johansson U.S. Pat. No. 3,751,586, the estimate is not adaptive to variations of the background in the horizontal (along the scan-line) direction.

SUMMARY OF THE INVENTION

The present invention overcomes the problems found in the prior art by using a two dimensional recursive filter to determine the average brightness of an area (as opposed to a line), subtracting the average brightness of this area from the incoming signal to produce a signal which contains primarily only local variations, enhancing the local variations to improve the contrast and then reintroducing a portion of the average signal back into the system so that the new signal's maximums are at about the white saturation voltage level while the minimums are at about the black voltage level for use by the display. The use of the two dimensional recursive filter considerably simplifies the circuitry needed for the implementation of this scheme.

DETAILED DESCRIPTION OF THE PREFERRED EMBODIMENTS

Figure 1:
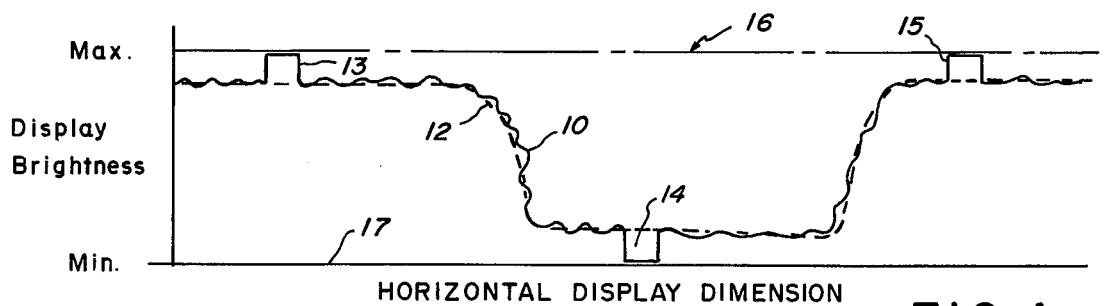
FIG. 1 shows the variations that might exist in a single line of signal being presented to a display.
Figure 2:
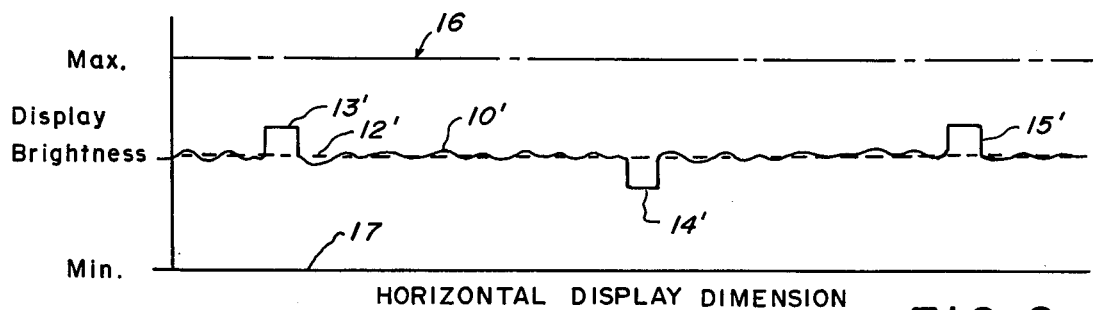
FIG. 2 shows the signals of FIG. 1 with the average signal having been subtracted.

FIG. 1 shows a single line of signal that might exist at the input of a display such as a cathode ray tube. The signal in FIG. 1 is plotted with the vertical axis representing display brightness and the horizontal axis representing the horizontal dimension of the display. As seen in FIG. 1, a signal of varying brightness, represented by solid line 10, has an average brightness shown by dashed line 12. It is seen that from one side of the display to the other, the signal is shown to vary from relatively high brightness to relatively low brightness and back to relatively high brightness again. This variation can also be present from the top of the scene to the bottom in the vertical direction. Three objects, identified by reference numerals 13, 14 and 15, are also shown against the three background areas. These objects possess a low contrast (difference in intensity) relative to their backgrounds. Also shown in FIG. 1 is a dot dash line identified by reference numeral 16 which is indicative of the saturation level for the display and signals which increase in brightness to beyond this level will become lost. Similarly, the base line identified with reference numeral 17 represents the lower threshold level or total blackness area and signals which decrease in brightness to below this level become lost. Accordingly, a global gain which only increases the level of all of the signals found in FIG. 1 will produce saturated images in which the objects are lost. A method of avoiding this problem is to subtract out the local average signal represented by dash line 12 from the actual signal represented by solid line 10 to produce a signal which only has local variations, enhance this signal by a predetermined amount and then to reintroduce a portion of the average signal so as to cause the greater variations in the local signal to vary about an average signal that stretches the local variations to just between the lower limit 17 and the upper limit 16 without going beyond. FIG. 2 shows the signals of FIG. 1 with the average value having been subtracted. In FIG. 2, the local variation signal is identified by a solid line 10' and the average signal, which is now horizontal, is shown by dash line 12'.

Figure 3:
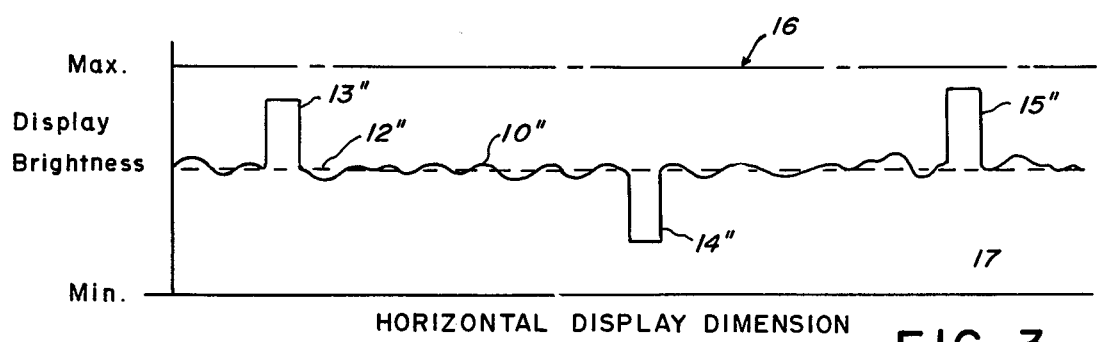
FIG. 3 shows the signal of FIG. 2 with the individual variations having been enhanced.
Figure 4:
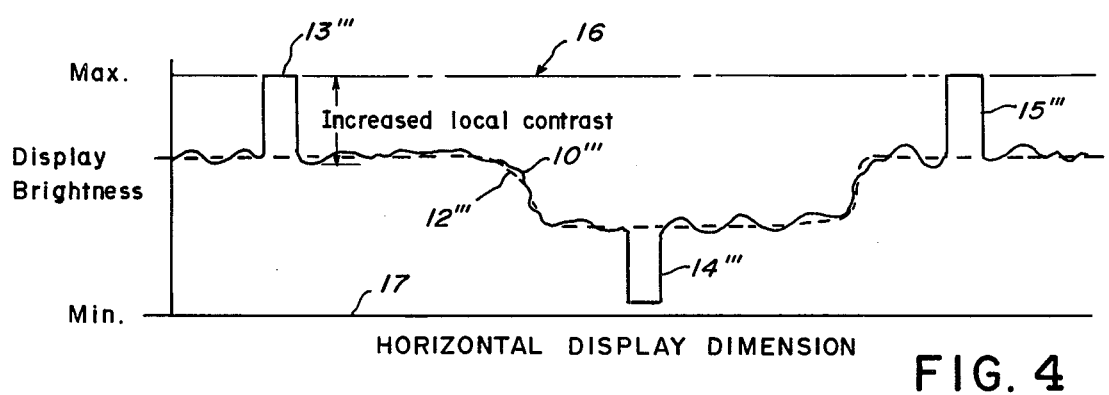
FIG. 4 shows the signal of FIG. 3 with some of the average variations having been reintroduced.

The amplitude of the object signals, identified by reference numerals 13', 14', 15' in FIG. 2, remain approximately the same as they were in FIG. 1. FIG. 3 shows the signal of FIG. 2 having been amplified so that the amplitude of the object signals, now identified by reference numerals 13″, 14″ and 15″, have increased but are not very close to the upper and lower saturation limits 16 and 17. The amount of amplification used depends on the absolute value of the average brightness as will be explained in connection with FIG. 10. This amplified signal in FIG. 3 is shown by the solid line identified with reference numeral 10″ and the average signal, which is still a horizontal dashed line is represented by reference numeral 12″. FIG. 4 shows the signal of FIG. 3 with some of the average variation having been reintroduced. In FIG. 4, the local enhanced signal is a solid line identified by reference numeral 10‴ whereas the average signal is now a somewhat reduced version of the average signal 12 of FIG. 1 and is identified by a dashed line 12‴. As can be seen, the enhanced signals of the objects, now identified by reference numerals 13‴, 14‴ and 15‴, are made to just approach the upper and lower limits 16 and 17 respectively. Thus the signal of FIG. 1 has now been enhanced so that the local contrast of the objects relative to their backgrounds are increased without going into the saturation areas.

The process described above would be fairly easy to accomplish if only the background estimates from single lines were all that were needed for enhancement. As mentioned before, the variation in the background can occur in a vertical direction as well. Therefore, it is necessary to determine the local average not just from the scan line but from a two dimensional area surrounding each point in the line. This two dimensional area may span a number of scan lines.

Figure 5:
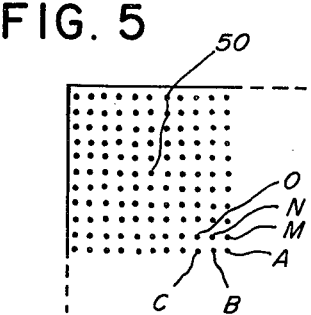
FIG. 5 shows an area containing a plurality of individual pixels of brightness.

FIG. 5 shows an area consisting of the matrix of eleven by eleven picture elements or "pixels" representative of a portion of a display such as a cathode ray tube. The eleven by eleven display area shown in FIG. 5 is one of a large number of such areas in an overall display. For example, a standard vidicon tube may comprise 525 horizontal lines across the tube with each line containing 500 pixels. This would result in approximately a total of 500×525=262,500 of such areas. Thus, to enhance the overall image, it will be necessary to find the average in each of these areas, to subtract this average brightness from the incoming signal, expand or enhance the contrast of the remaining signal and then add a portion of the average signal back in. This must be accomplished over and over again for all such matrixes surrounding each image point within the overall scene.

Figure 6:
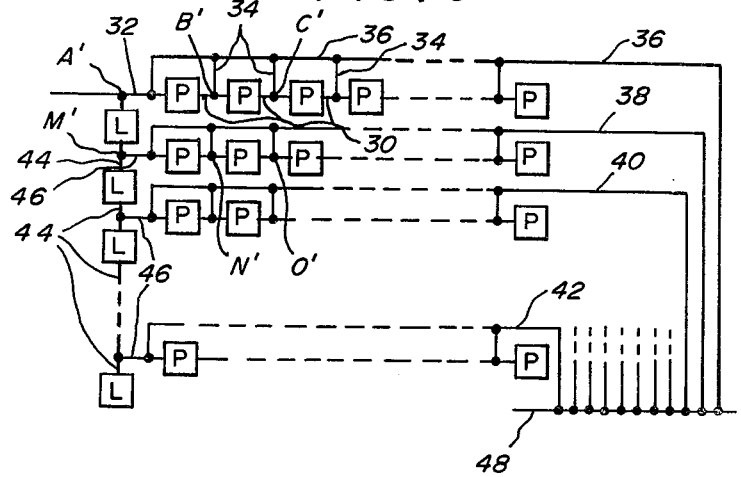
FIG. 6 is a block diagram showing delay lines operable with the area of FIG. 5 to produce an average brightness signal.

One way of obtaining the average brightness for the eleven by eleven matrix of FIG. 5 is to sum all of the signals indicative of the brightness of the individual pixels together. A circuit which can perform this function is shown in FIG. 6. In FIG. 6, a plurality of horizontally spaced boxes, identified with the letter "P" therein are shown arranged in horizontal rows one above each other to form a matrix of eleven by eleven boxes similar to the arrangement of pixels of FIG. 5. (Not all of these boxes are shown in FIG. 6 so as to preserve the simplicity in the drawing.) Each of the boxes containing the letter "P" represents a delay line (or shift register) which delays the signal by an amount of time necessary to move the incoming signal one pixel. At the far left end of the horizontal rows of pixel delay boxes, there is shown a vertically arranged row of boxes containing the letter "L" and one of these boxes separates each horizontal row of pixel delay lines. Each of the boxes containing the letter "L" represents a delay line (or shift register) which is of magnitude sufficient to delay the signal by the time necessary for one entire line scan of the display device. The pixel and line delays may be commercially available charge coupled device delay lines, glass delay lines, surface acoustic delay lines or, in the case of a digital implementation, a random access memory or shift register may be used. Each of the pixel delay boxes in the upper row of FIG. 6 is separated from its neighbor by a line identified by reference numeral 30 and the input to the left end pixel delay box is identified by reference numeral 32 which provides the input signal that is presented to the apparatus of FIG. 6. Each of the lines 30 and line 32 is shown connected by conductor 34 to a common line 36. In similar fashion, each of the intersections between pixel delay boxes of the second row of FIG. 6 are connected to a common line 38 and each of the intersections between pixel delay boxes in the third row is connected to a common conductor 40. This continues throughout the entire maxtrix of eleven rows with the last row of pixel delay boxes being connected to a common conductor 42.

Each of the line delay boxes is shown connected by conductors identified with reference numerals 44 to each adjoining line delay box with the initial input to the first line delay box being connected to line 32. Each of the lines 44 between the delay boxes is connected by conductors identified with reference numeral 46 to the left end pixel delay box in each of the rows.

All of the common conductors are shown connected to a final output conductor 48 in FIG. 6 to receive all of the signals from the various pixel lines.

In FIG. 5, the pixel in the lower right hand corner has been identified with the letter A, the pixel next adjacent to it on the left identified by letter B and the third pixel to the left identified by letter C. In similar fashion, the first pixel above pixel A has been identified by letter M, the pixel immediately to its left identified by letter N with the third pixel in the second from bottom row right being identified by letter O. In FIG. 6, a signal representative of the brightness of the pixel identified as A in FIG. 5 will appear at a point shown as A′ on line 32 while the signal representative of the brightness of pixel B in FIG. 5 will appear at point B′. In similar fashion, the signals representative of the brightness of pixels C, M, N and O will appear at points in FIG. 6 shown as C′, M′, N′ and O′. Since each of the delay lines identified with the letter P delays the signal by one pixel, the signals which appear at points A′, B′ and C′, etc. will all occur at the same time so that on line 36 a signal representative of all of the signals from each of the pixels in the lower row of FIG. 5 will occur. Likewise, the signal on common conductor 38 will represent the signals M′, N′ and O′ and all other signals indicative of the brightness of the pixels in the second from the bottom line of FIG. 5. Likewise, the signal on common conductor 40 and on common conductor 42 will be representative of the magnitude of the brightness on all of the pixels in the third from the bottom row and the top row respectively of FIG. 5. Since each of the rows of delay lines in FIG. 6 is separated by a delay line which delays the signal by an amount equal to one line scan, the signal at point A′ will occur simultaneously with the signal at point M′ and likewise on down until the bottom row of delay lines. Thus, the signals on conductors 36, 38, 40 and 42 will all occur simultaneously with the end result that the signal on line 48 will be indicative of the brightness of all of the pixels of FIG. 5 at the same time. This signal then is representative of the average value of brightness for the area shown in the matrix of FIG. 5 and is the signal which is used to be subtracted from the incoming signal so as to provide a signal having only local variations therein.

A pixel in the center of FIG. 5, identified by reference numeral 50, will have a predetermined brightness itself and this pixel can be considered as the local signal for the area of FIG. 5 so that when the signal on line 48 has been subtracted from the incoming signal, the signal which appears at pixel 50 will be expanded by an amount depending upon the magnitude of the signal on line 48 and then when a portion of the magnitude of the signal on line 48 is returned to the signal as was shown in FIG. 4, this will be added to the pixel identified as 50 to provide the local area contrast enhancement.

After obtaining the signal from the area shown in FIG. 5, the whole process would then again be repeated for the next area which will consist of an 11 by 11 area moved one pixel to the right where the first vertical column of pixels in FIG. 5 would be dropped and new column of pixels just to the right of those containing pixels A and M would be added. The new eleven by eleven area would be operated upon as was described in connection with FIG. 5 and FIG. 6.

An embodiment similar to that presented above has been suggested in the prior art for computing the local average with digital shift registers being used for the line delays. In the prior art, a moving window of 9 rows by 9 columns has been suggested, requiring eight line delays and the summing of 81 values in the window. While this prior art, as exemplified by the apparatus of FIG. 6, will accomplish the desired result, it can be seen that a very large number of delay lines and summing circuits are needed in order to get the enhancement desired. Such an architecture is bulky, expensive and high power consuming. Furthermore, the delay lines (if analog) do tend to introduce noise and loss of signal, and with the large number of them involved in series, considerable noise and loss of signal occurs in the overall result.

An alternate way of obtaining a running (or moving) average is known in the prior art as a recursive filter. A recursive filter obtains a running average without explicitly averaging the large number of intensities in a given window. For example, with a large series of numbers, the running average over 10 points, for example, can be at least closely approximated by taking 9/10 of the previous average and adding 1/10 of the next number in the series so as to obtain a first result. Thereafter, taking 9/10 of the first result and adding it to 1/10 of the next number in the series will obtain a second result. Subsequently taking 9/10 of the second result, adding it to 1/10 of the next number in series will obtain a third result, etc. By this procedure, the results obtained are found to continually approximate the running average (of approximately 10 numbers) and the apparatus for performing this is called a recursive filter.

Figure 7:
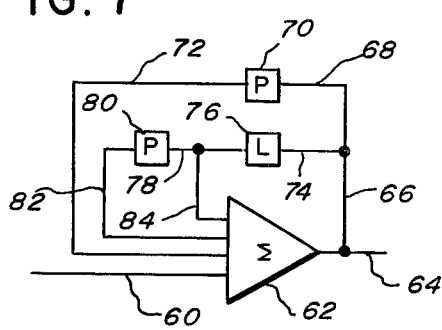
FIG. 7 is a block diagram showing one form of recursive filter.

FIG. 7 shows one form of a two dimensional recursive filter that may be used in the present invention. In FIG. 7, the input appears on a conductor 60 and is presented to the lower of four input terminals of a summing circuit 62 which has an output on a conductor 64. The output on conductor 64 is presented by a conductor 66, a conductor 68, a pixel delay 70, and a conductor 72 to the second input of summing circuit 62. The output on line 64 is also presented by conductor 66, a conductor 74, a line delay 76, a conductor 78, a pixel delay 80 and a conductor 82 to the third of the inputs to summing circuit 62. Finally, the output on conductor 64 is presented by conductor 66, a conductor 74, line delay 76, conductor 78 and a conductor 84 to the fourth of the inputs of summing circuit 62. Thus, the summing circuit 62 receives four signals and performs a weighted sum thereof. The first is the input signal itself, a second is the output signal delayed by one pixel through pixel delay 70, the third is the output signal delayed by one line and one pixel through delays 76 and 80 and the fourth is the output signal delayed by one line delay. The output on line 64 is a running average of the input signal appearing on line 60 and may be used in place of the large number of delay lines found in FIG. 6. In this example, only one line delay and four sums were needed, compared with the 10 line delays and 121 sums needed in the prior art. Moreover, the effective size of the local area over which the moving average is computed can be achieved simply by changing the weights at the input of summing circuit 62.

Figure 8:
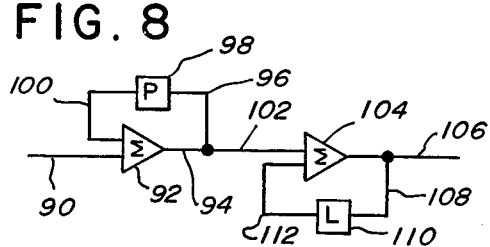
FIG. 8 is a block diagram showing an improved version of the recursive filter of FIG. 7.

A simplified version of the appartus of FIG. 7 is found in FIG. 8 wherein two recursive filters are shown in cascade. The input appears on line 90 to a first summing circuit 92, the output of which appears on line 94. The signal on line 94 is fed back by a conductor 96 through a pixel delay 98 and a conductor 100 to the other input of the summing circuit 92. Thus, the output of summing circuit 92 on line 94 is the sum of the signal itself and the output signal of summing circuit 92, delayed by one pixel. This represents the running average of the input signal along the scan-line direction. This signal is presented by conductor 102 to one input of a second summing circuit 104 which has an output on conductor 106. The output on conductor 106 is fed by a conductor 108, a line delay 110 and a conductor 112 to the other input of summing circuit 104. Therefore, the output on line 106 is indicative of the sum of the output of the first filter plus the output signal of summing amplifier 104 delayed by one line. This provides the two dimensional running average of the various signals appearing on line 90.

Figure 9:
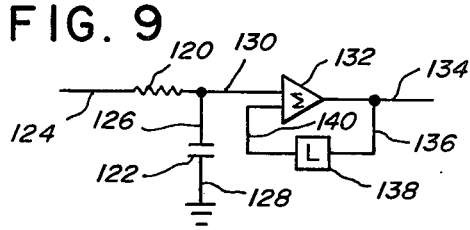
FIG. 9 is a schematic and block diagram of a simplified recursive filter.

The circuits of FIGS. 7 and 8 can be constructed with either analog or digital circuit elements. In an analog implementation, the circuit can be further simplified as shown in FIG. 9. In FIG. 9, the first summing circuit and pixel delay have been replaced by a resistor 120 and a capacitor 122. In FIG. 9, the input is on a line 124 connected to one end of resistor 120, the other end of which is connected by a line 126 to one side of capacitor 122, the other side of which is connected by a conductor 128 to ground. Conductor 126 is also connected by a conductor 130 to one input of a summing amplifier 132, the output of which is shown on a conductor 134 which is connected by a conductor 136 to a line delay 138 and by a conductor 140 to the other input of summing circuit 132. Resistor 120 and capacitor 122 form a low pass filter which performs the same function as the summing circuit 92 and pixel delay 90 of FIG. 8 so that the output on line 134 is again indicative of the two dimensional running average of the signals appearing on line 124.

Figure 10:
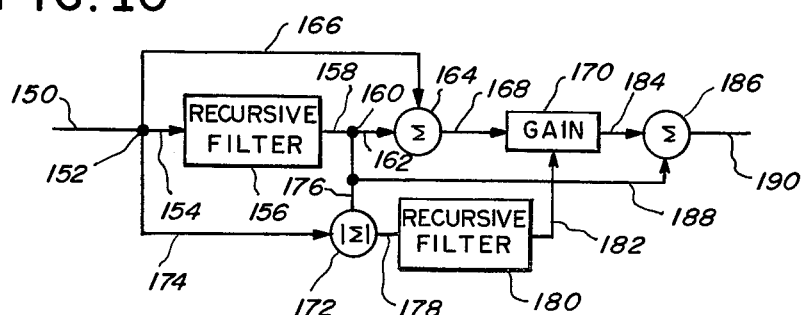
FIG. 10 is a block diagram of the present invention for producing a local area contrast enhanced signal.
Figure 11:
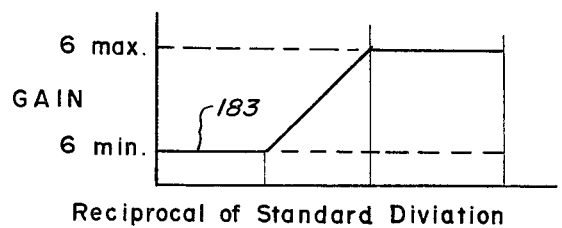
FIG. 11 is a graph showing gain change as a function of standard deviation for the amplifier of FIG. 10.

The present invention uses two dimensional recursive filters such as those found in FIGS. 7, 8 and 9 to produce the running averages necessary to provide local area contrast enhancement. The circuit for performing the enhancement is shown in FIG. 10. In FIG. 10, the input signal appears on a conductor 150 which is presented to a junction point 152. Junction point 152 is connected by a conductor 154 to a first recursive filter 156 having an output on conductor 158 connected to a junction point 160. The signal at point 160 will therefore be a running average of the signals appearing on line 150. This junction point is connected by a conductor 162 to a subtracting circuit 164 which has as its second input a signal coming from junction point 152 over a conductor 166. The output of summing circuit 164 appears on a conductor 168 and will be representative of the running average obtained at junction point 160 subtracted from the input signal on line 166. This then will provide the signal such as is shown in FIG. 2 in which only the local variations appear. This signal is presented to a variable gain amplifier 170 so that the local variations may be enhanced or increased by an amount which depends upon the average absolute value of the difference between the running average and the actual signal. The difference signal is obtained by a absolute value circuit 172 which receives as its inputs the input signal from junction point 152 over conductor 174 and the running average signal from junction point 160 over conductor 176. Absolute value circuit 172 produces an output on conductor 178 representing the absolute difference between the values of the input signal and the average signal. This signal is presented to a second recursive filter 180 so as to produce an output on a line 182 representative of the running average of the absolute difference between the input signal and the average signal. The output line 182 is a measure of the local standard deviation at that point and is used to control the gain of the variable gain amplifier 170. The gain is an inverse function of this local standard deviation being larger at points where the local standard deviation is lower and smaller where it is larger. To prevent the gain from being inordinately large in areas with small standard deviation, this inverse function is as shown in FIG. 11. In FIG. 11, the vertical axis represents the gain of amplifier 170 while the horizontal axis is the reciprocal of the standard deviation as is available at the output of the recursive filter 180 on line 182 of FIG. 10. The gain is shown in FIG. 11 to vary from a minimum level, represented by horizontal dashed line G min, to a maximum level, represented by horizontal dashed line G max. The gain curve is shown as a solid line 183 having three portions. In areas with large standard deviation, as in the left hand portion of FIG. 11, the gain is small and constant at the G min level. In areas with very small deviation, as in the right hand portion of FIG. 11, the gain is constant and large at the G max level. In areas with standard deviations between those limits such as in the middle portion of FIG. 11, the gain varies linearly with the reciprocal of the standard deviation from G min to G max. The constant of proportionality which determines the slope of the middle portion of curve 183 is determined empirically for best visual presentation. This slope should be adjusted to prevent the gain from being excessively large in areas with small standard deviation as may occur when the portions of the scene being viewed have little contrast. This also avoids undue amplification of sensor noise.

In FIG. 10, line 182 is shown connected to the variable gain amplifier 170 so as to vary the gain of this amplifier 170 in accordance with the reciprocal of the standard deviation available at the output of the recursive filter 180. An enhanced signal similar to that of FIG. 3 will then appear at the output of gain device 170 on line 184 and this enhanced signal is presented to a summing circuit 186. Summing circuit 186 receives as another input the signal on a line 188 which is connected via conductor 176, to junction point 160 and conductor 158 to the output of the first recursive filter 156. Summing device 186 operates to add a portion of the signal representative of the average appearing at junction point 160 to the enhanced signal appearing on line 184 so as to produce the resultant output signal on an output conductor 190 similar to that shown in FIG. 4 although in two dimensions rather than one. This resultant output signal then is used to drive the display electronics to produce the local area enhanced scene for viewing.

It is thus seen tht I have provided a novel apparatus for obtaining local area contrast enhancement and have been able to minimize the number of delay lines and components along with the minimization of noise signals introduced thereby from the prior art. Many obvious alterations or changes to the circuits used in connection with the description will occur to those skilled in the art and I do not intend to be limited to the specific disclosures used in connection with the preferred embodiments but rather intend only to be limited by the appended claims.

The embodiments of the invention in which an exclusive property or right is claimed are defined as follows:

1. A system for providing local area contrast enhancement of an input signal comprising two dimensional recursive filter means connected to receive the input signal for producing a running average of the input signal, first means connected to receive the input signal and connected to said recursive filter means to receive the running average for subtracting the running average from the input signal to produce a subtracted signal, second means connected to said first means to receive the subtracted signal for amplifying the subtracted signal by an amount which varies with the running average to produce an amplified signal and third means connected to said second means to receive the amplified signal and connected to said first means to receive the running average for adding a portion of the running average to the amplified signal to produce an enhanced signal.

2. Apparatus according to claim 1 wherein the input signal is a vidicon signal and said recursive filter means averages an area consisting of a predetermined number of pixels in a predetermined number of lines so that the enhanced signal represents enhancement of the area.

3. Apparatus according to claim 1 wherein said second means comprises a variable gain amplifier, the gain of which is adjusted by means responsive to the running average.

4. Apparatus according to claim 3 wherein the means responsive to the running average comprises an absolute value circuit connected to receive the input signal and connected to said recursive filter means to receive the running average for producing an absolute value signal indicative of the absolute value of the difference between the running average and the input signal.

5. Apparatus according to claim 4 further including second recursive filter means connected to said absolute value circuit to receive the absolute value signal and operable to produce a gain change signal representing the running average of the absolute value signal and means connecting the variable gain amplifier to the second recursive filter means, the gain of the variable gain amplifier being changed by the gain change signal.

6. Apparatus for providing local area contrast enhancement of a vidicon signal which contains fluctuations indicative of a scene containing a target in a background comprising in combination:

a first recursive filter having an input connected to receive the vidicon signal and operable to produce a first output signal indicative of the running average of the vidicon signal fluctuations;

first summing means having a first input connected to receive the vidicon signal, having a second input connected to the first recursive filter to receive the first output signal and operable to produce a first sum signal indicative of the difference between the vidicon signal and the summing average of the vidicon signal;

an absolute value circuit having a first input connected to receive the vidicon signal, having a second input connected to said first recursive filter to receive the first output signal and operable to produce a second sum signal indicative of the absolute difference between the vidicon signal and the running average of the vidicon signal;

a second recursive filter having an input connected to said absolute value circuit to receive the second sum signal and operable to produce a second output signal indicative of the running average of the second sum signal;

variable gain means having a first input connected to said first summing means to receive the first sum signal, having a second input connected to said second recursive filter to receive the second output signal and operable to produce a modified output signal indicative of the first sum signal amplified by an amount dependent upon the magnitude of the second output signal; and second summing means having a first input connected to said variable gain means to receive the modified output signal, having a second input connected to said first recursive filter to receive the first output signal and operable to produce a resultant signal indicative of the sum of the modified output signal and a portion of the running average of the vidicon signal.

7. Apparatus according to claim 6 wherein the first recursive filter averages a moving area consisting of a predetermined number of pixels in a predetermined number of lines from the vidicon signal so that the first output signal represents the running average of the moving area.

8. Apparatus according to claim 7 wherein the first recursive filter includes a summing circuit which has weighting circuits therein so that a predetermined portion of the input signal is used in the recursive filter to determine the size of the area.

* * * * *